2 Sheets—Sheet 1.

J. PARR.

Assignor to L. A. McCOLLUM, Executrix of J. A. McCOLLUM, Deceased.

CRACKER-MACHINE.

No. 7,403. Reissued Nov. 28, 1876.

Witnesses:
M. Ryan
Fred. Haynes

Joseph Parr
by his Attorneys
Brown & Allen

N. PETERS, PHOTO-LITHOGRAPHER, WASHINGTON, D. C.

2 Sheets—Sheet 2.
J. PARR.
Assignor to L. A. McCOLLUM, Executrix of J. A. McCOLLUM, Deceased.
CRACKER-MACHINE.
No. 7,403. Reissued Nov. 28, 1876.
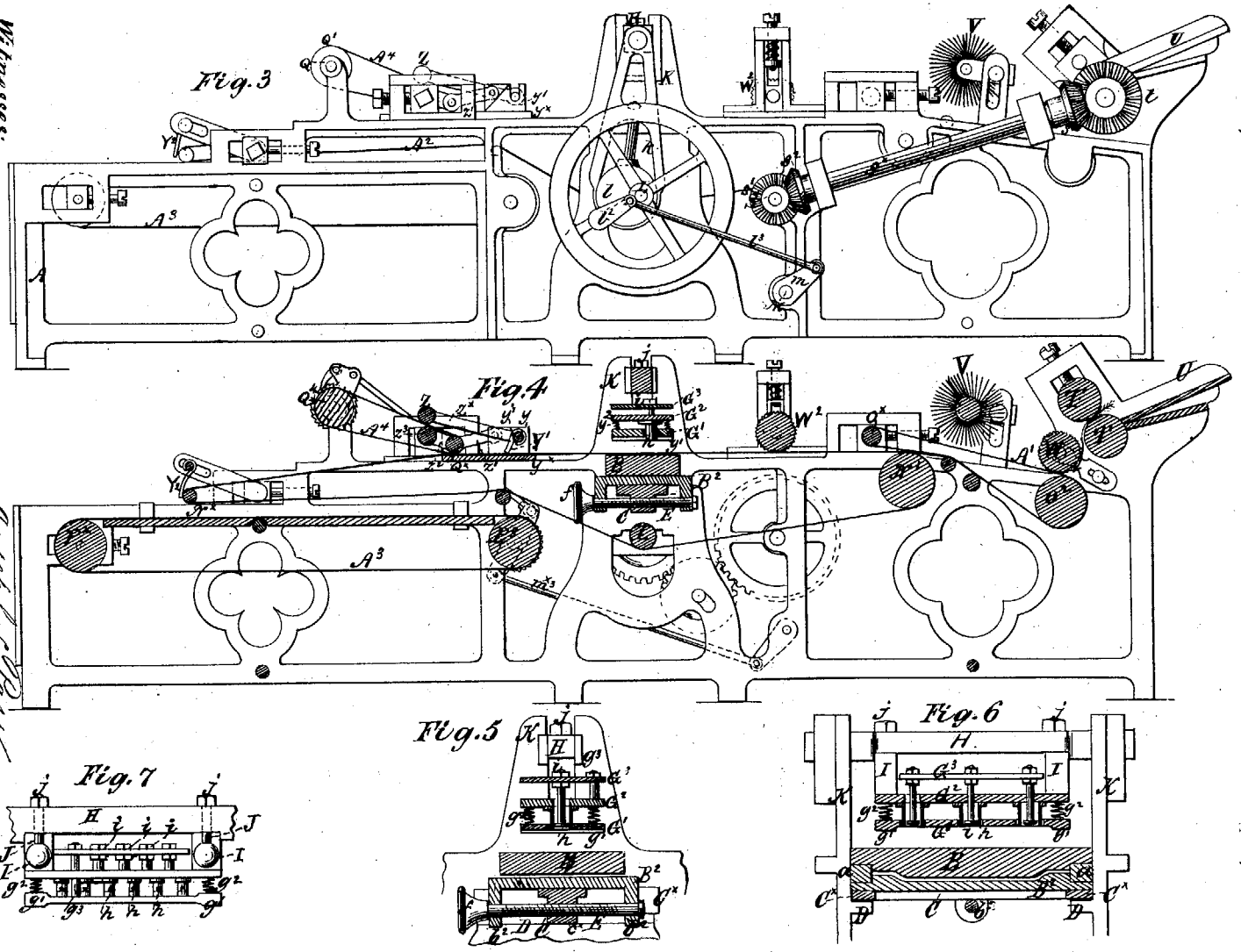
Witnesses:
M. Ryan
Fred. Haynes
Joseph Parr
by his Attorneys
Brown & Allen
N. PETERS, PHOTO-LITHOGRAPHER, WASHINGTON, D. C.

UNITED STATES PATENT OFFICE.

JOSEPH PARR, OF NEW YORK, N. Y., ASSIGNOR TO LYDIA ANN McCOLLUM, EXECUTRIX OF JOHN McCOLLUM, DECEASED.

IMPROVEMENT IN CRACKER-MACHINES.

Specification forming part of Letters Patent No. 169,834, dated November 9, 1875; reissue No. 7,403, dated November 28, 1876; application filed November 9, 1876.

*To all whom it may concern:*

Be it known that I, JOSEPH PARR, of New York, in the county and State of New York, have invented certain Improvements in Cracker-Machines; and I do hereby declare that the following is a full, clear, and exact description of the same, reference being had to the accompanying drawing, which forms part of this specification.

My invention consists, first, in a novel combination and arrangement of devices whereby the bed-plate may be readily raised and lowered to accommodate it to cutters of different lengths, to compensate for wear of the cutters, or to regulate the pressure thereof; also, in a novel construction and arrangement of the crimping-roller, whereby its proper operation is insured; likewise, in a scrap-roller, arranged to bear upon the apron which carries off the scrap, and so that it is driven by friction of the dough, said scrap-roller acting on the scrap to hold it on the apron against the pull of the fingers which expel the crackers. It also consists in a combination of a stationary lower supporting bar or base for the scrap-apron with the scrap-roller bearing on the latter over said bar, and in a combination of the scrap-roller, said stationary bar, and the shaft which carries the fingers, all made adjustable together and yielding, to provide for working different thicknesses of dough, and whereby said devices are made to accommodate themselves to passage of lumps in the dough and various irregularities; and, in this relation, the invention specially consists in a scrap-roll attached to the finger-shaft by independent links or rods, which allow its ends to rise independently of each other. Furthermore, the invention consists in a novel arrangement and combination of mechanism for operating the endless aprons, whereby their operation is simplified and their efficiency insured.

Figure 1:
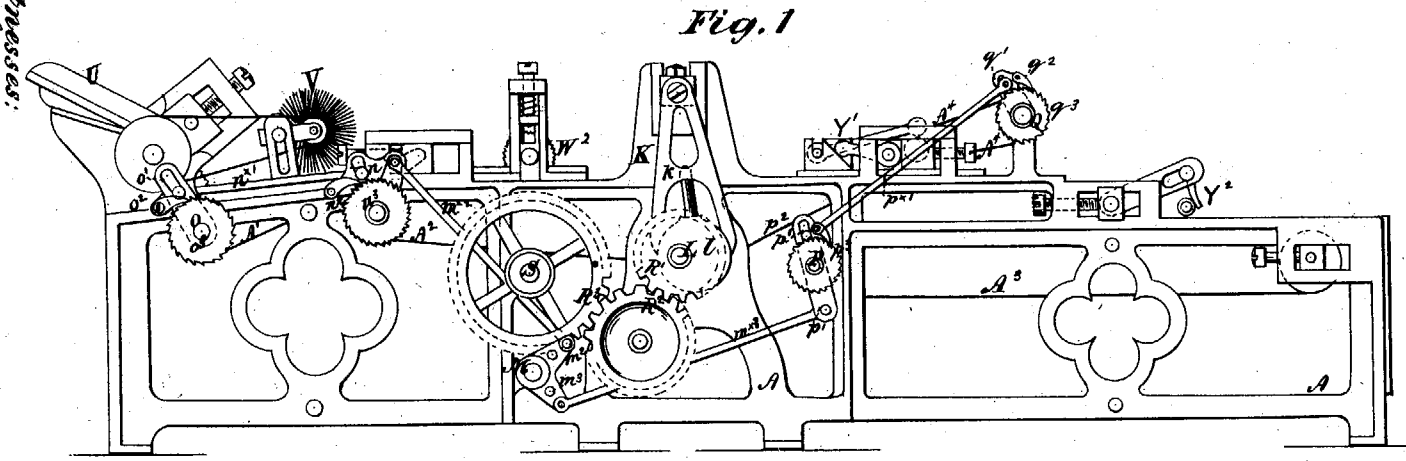
Figure 2:
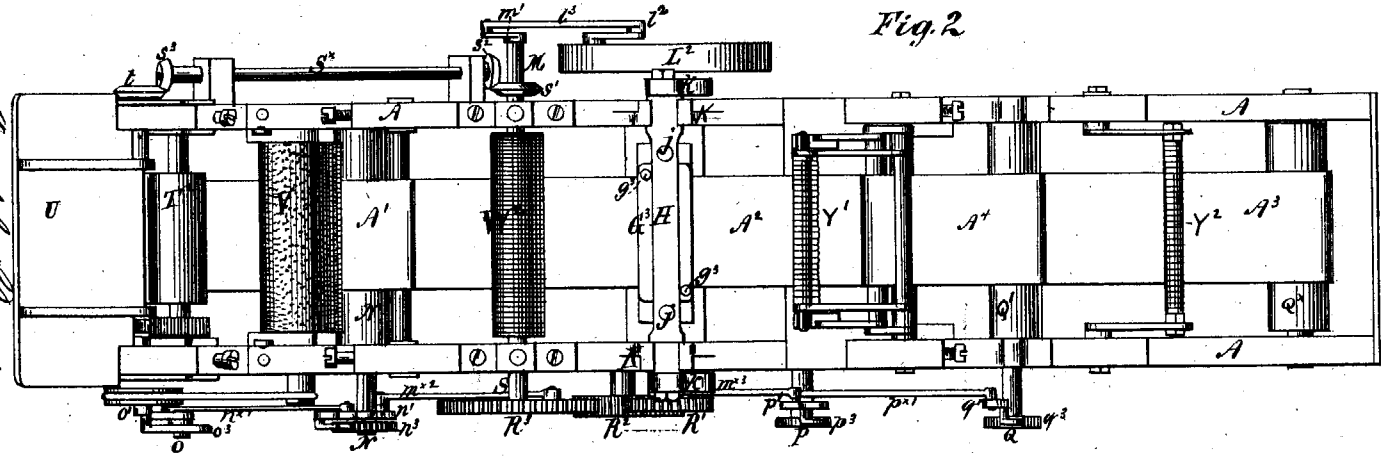

In the accompanying drawing, Figure 1 is a side view of a machine constructed according to my invention. Fig. 2 is a top view of the same. Fig. 3 is a view of the side opposite to that shown in Fig. 1. Fig. 4 is a longitudinal vertical section. Fig. 5 is a sectional view of the bed-plate and cutters on a larger scale than shown in Fig. 4. Fig. 6 is a section of the same transversely of the machine. Fig. 7 is a detail view of the cutter-frame.

The working parts of the machine are arranged in a frame-work, A, which is of any suitable construction, and is provided with endless aprons $A^1$ $A^2$ $A^3$ $A^4$, arranged in the usual manner, for conveying the dough, the crackers, and the scrap through the machine. About midway of the length of the machine the bed-plate is located, and immediately over it the cutter-frame is arranged in vertical ways, and provided with mechanism for imparting to it a vertical reciprocating motion. The bed-plate B is arranged transversely of the machine, with each of its ends between two vertical ways or guides, consisting of lugs or ribs *b*, extending inward from the side pieces of the frame. Immediately under the bed-plate B is another plate, $B^2$, of the same size and shape, and arranged between the guides *b*. Between these two plates, near their ends, are two strips of rubber, *a*, which may lie in grooves formed in the plates, to prevent their displacement. The thickness of the rubber strips is such as to separate the two plates very slightly, and only sufficient to impart a certain degree of elasticity to the bed-plate, and allow it to yield slightly under the pressure of the cutters.

The two plates may be connected together by bolts, which may work freely in one of the plates, so as to allow it to rise and fall independently of the other. Immediately under the plate $B^2$ is a bar, C, at each end of which is a cross-head, $C^x$. The upper surfaces of the cross-heads are horizontal, and parallel with the lower side of the plate $B^2$. The lower surfaces of the cross-heads are inclined from a horizontal line, and rest upon the upper surfaces of two projecting ribs or bars, D, extending inward from the side pieces of the frame A, one on each side.

The lower surfaces of the ribs or bars D may be horizontal, and parallel with the surfaces of the plates B $B^2$; but their upper surfaces form inclined planes running in a contrary direction to the inclined lower surfaces of the cross-heads, so that when said cross-heads are in place on said inclined planes the upper surface of the bed-plate is in a horizontal position.

On two opposite edges of the plate $B^2$, midway between its ends, are two perforated lugs, $b^2$ $b^2$, extending downward, and on the bar C, midway of its length, and in line with the lugs $b^2$, is a screw-threaded lug or nut, $c^\times$. A screw-threaded rod, E, passes through the lugs $b^2$ and nut $c^\times$, and is arranged to revolve freely in said lugs, but is secured against longitudinal motion by means of a milled head or knob, *f*, at one end, outside of one of the lugs, and a pin or collar and set-screw or other suitable device at the other end, outside of the other lug, while the screw-threaded portion engages with the nut $c^\times$.

By turning the screw E in one direction the bar C is drawn toward one end of the machine, causing the cross-heads $C^\times$ to travel upward on the inclined planes D, and raise the bed-plate B to the desired height. By turning the screw in the opposite direction the bar C is moved toward the other end of the machine, causing the cross-heads to travel downward on the inclined planes, and lower the bed-plate to the desired level. Both the upward and downward motions are perfectly uniform throughout, and the bed-plate maintains its horizontal position. By this means the bed-plate may be readily raised and lowered to accommodate it to cutters of different lengths, or to compensate for wear of the cutters, or to regulate the amount of pressure.

The bed-plate is usually so adjusted with relation to the cutter-frame that the contact of the cutters with the bed-plate takes place just before they have reached the termination of their downward stroke, so that after the crackers are cut the edges of the cutters remain a short time in contact with the bed before commencing their upward stroke, in which case the elasticity imparted to the bed-plate by the rubber strips *a* allows it to yield sufficiently to prevent injury to the cutters.

In a patent granted to John McCollum, dated March 23, 1852, No. 8,828, and reissued May 31, 1859, No. 730, the bed-plate is described as being rendered elastic, so as to enable it to yield under the pressure of the cutters, by means of spiral springs under the bed-plate attached to lugs on the frame of the machine.

In my invention the same result is accomplished with equal efficiency and in a more simple manner by means of the rubber. If an unyielding bed-plate is desired, however, the rubber may be replaced by wood, iron, or other hard substance.

The cutter-frame is constructed of three plates, $G^1$ $G^2$ $G^3$, arranged in parallel planes, one above another. The lower plate $G^1$ is provided at its ends, on the lower side, with projections $g^1$, about equal to the thickness of the dough from which the crackers are to be cut. The middle plate $G^2$ is connected to the lower plate by means of spiral springs $g^2$, placed between said plates near their edges or corners. The upper plate $G^3$ is connected with the lower and middle plates by means of posts or bolts $g^3$, which pass freely through holes in the middle plate, and have their ends rigidly attached to the lower and upper plates by riveting or by screw-threads and nuts, so that the middle plate is free to rise and fall between the upper and lower ones. The cutters consist of hollow tubes *h*, of cylindrical or other form, according to the shape to be given to the crackers. These cutters are open at both ends, and their upper ends are provided with lugs or flanges, by means of which they are attached to the middle plate $G^2$ by screws, rivets, or bolts, so that they may be removed and replaced when desired. Their lower ends or cutting-edges work freely in holes in the lower plate $G^1$, and when at rest they are about flush with the lower surface of said plate.

The cutters are provided with clearers, consisting of pistons or plungers *i*, which work freely in the cutters and in holes in the middle plate, and are secured to the upper plate by nuts engaging with screw-threads formed on them. Each clearer is provided with two nuts, one of which is placed above the upper plate and the other below it, by which means the clearers are adjusted to the proper positions with relation to the lower plate and the cutters, and by which means, also, the distance between the middle and upper plates, and the consequent pressure of the springs $g^2$, is regulated.

The cutter-frame thus constructed is arranged and operated in the machine as follows: On the upper side of the middle plate $G^2$, at or near its ends, are two sockets, I I, corresponding in form with threads on the lower ends of two bolts, J J, which pass through a cross-head, H, and are provided with nuts *j* at their upper ends. The sockets are open toward one edge of the plate, and the cutter-frame is placed in position on the cross-beam by moving it laterally, so as to cause the heads of the bolts to slip into the sockets, and is then secured by tightening the nuts *j*. By this arrangement the cutter-frame is readily removed and replaced when desired. The cross-head H is arranged to work in vertical ways or guides in two standards, K K, and has a vertical reciprocating motion imparted to it by means of eccentric rods *k k*, driven by eccentrics *l* on the main shaft L. As said main shaft revolves, the cutter-frame descends upon the dough and cuts the crackers, and as the revolution of the shaft continues, the cutter-frame rises and allows the dough to be fed forward above the bed-plate to receive another cut. As the cutter-frame descends the projections $g^1$ on the lower plate $G^1$ strike the bed-plate B on either side of the apron $A^2$, and arrest the downward motion of said plate. The middle plate $G^2$ continues its downward motion, depressing the cutters *h*, until the eccentric rods *k* reach and pass the lowest point in the revolution of the main shaft, whereupon the middle plate $G^2$ rises until the cutting-edges of the cutters $h$ are flush with the surface of the plate $G^1$, and then the entire cutter-frame rises until it reaches its highest position. As the cutter-frame rises the clearers $i$ expel the crackers from the cutters, and leave them, with the scrap, on the apron $A^2$, which conveys them away and feeds up the fresh dough with an intermittent motion, as usual in other cracker-machines.

For operating the endless aprons with the usual intermittent motion, I employ mechanism arranged as follows: On the main shaft L or the fly-wheel $L^2$, attached thereto, is an adjustable crank or wrist pin, $l^2$, which is connected by a rod, $l^3$, with an arm, $m^1$, on one end of a rock-shaft, M, arranged transversely of the machine. At the other end of this rock-shaft are two arms, $m^2$ $m^3$, which may be arranged at any desired angle with relation to each other and to the arm $m^1$. The arm $m^2$ is connected by a rod, $m^{\times 2}$, with an arm, $n^1$, which works loosely on a shaft, N, and carries a pawl, $n^2$, engaging with a ratchet, $n^3$, which is rigidly attached to the end of said shaft N. The arm $n^1$ is connected by a rod, $n^{\times 1}$, with an arm, $o^1$, which works loosely on a shaft, O, and carries a pawl, $o^2$, engaging with a ratchet, $o^3$, which is rigidly attached to the end of the shaft O. The arm $m^3$ of the rock-shaft M is connected by a rod, $m^{\times 3}$, with one end of a double arm, $p^1$, which works loosely on a shaft, P, and carries a pawl, $p^2$, engaging with a ratchet, $p^3$, which is rigidly attached to the end of the shaft P. The other end of the arm $p^1$ is connected by a rod, $p^{\times 1}$, with an arm, $q^1$, which works loosely on a shaft, Q, and carries a pawl, $q^2$, engaging with a ratchet, $q^3$, which is rigidly attached to the end of the shaft Q.

By this arrangement and combination of mechanism the rock-shaft M receives motion through its arm $m^1$ from the main shaft, and transmits it through its arm $m^2$ to the shafts N and O, and through its arm $m^3$ to the shafts P and Q, so that, as the main shaft revolves, an intermittent rotary motion is imparted simultaneously to the four shafts N O P Q.

By arranging and combining the parts in the manner described, I obviate the necessity for the use of long crank-pins, such as have heretofore been used in machines of a similar character, and I accomplish the same result in a more simple manner. The apron $A^2$ passes around a roller, N′, on the shaft N, and a smaller roller, $N^\times$, arranged nearly over the shaft O. The apron $A^1$ passes around a roller, $O^2$, on the shaft O, and another roller, $O^\times$, near the opposite end of the machine. The apron $A^3$ passes around a roller, $P^3$, on the shaft P, and another roller, $P^\times$, near the delivery end of the machine. The apron $A^4$ passes around a roller, $Q^4$, on the shaft Q, and another roller, $Q^\times$, arranged over the apron $A^2$. As the four shafts N O P Q are rotated, as before described, the four aprons $A^1$ $A^2$ $A^3$ $A^4$ receive the desired intermittent motion and feed the dough to the cutters, and then convey the crackers and the scrap to their respective receptacles.

For operating the pressure-rolls at the feed end of the machine, I employ mechanism arranged as follows: On the main shaft L is a gear-wheel, $R^1$, meshing into a stud-gear, $R^2$, which, in turn, drives a gear, $R^3$, in the same direction as the main shaft. The gear $R^3$ is attached to one end of a shaft, S, on the other end of which, at the opposite side of the machine, is a bevel-gear, $s^1$, meshing into another bevel-gear, $s^2$, at the lower end of a shaft, $S^\times$, which carries, at its upper end, a bevel-gear, $s^3$. The bevel-gear $s^3$ meshes into a bevel-gear, $t$, on one end of the shaft of the lower pressure-roll T, which roll drives the upper roll $T^2$ by means of gearing at the opposite ends. The dough is fed into the machine over the feed-board U, and passes between the rollers $T^2$ in the usual manner. It is then turned downward and passed under the crimping-roll W, which is located between the roller $O^2$ and the lower dough-roller T, and is arranged in adjustable bearings, so that its pressure against the dough-roller may be regulated. The dough passes between the dough-rollers and under the crimping-roll, as indicated by the arrow $U^\times$ in Fig. 4. If desired, an ordinary crimping-roll, $W^2$, may be used near the bed-plate, in the usual manner. The brush V, for removing the superfluous flour from the dough, may be driven by a band, $v$, from a pulley on one of the dough-rollers. The fingers $Y^2$ are arranged, in the usual manner, near the delivery end of the machine. The fingers Y, for separating the crackers from the scrap, are arranged loosely upon a shaft, $y$, the ends of which are provided with bearings in boxes $y'$, which rest upon a plate, $y^\times$, over which the apron $A^2$ passes with the crackers and scrap.

Z is the scrap-roller, arranged to bear upon the apron $A^4$, which carries off the scrap, said roller being driven by friction of the dough passing under it. The weight or pressure of this roller is sufficient to insure the adherence of the scrap to the apron, and prevent it from being pulled or held back by the action of the fingers. Said roller is arranged immediately over the roller $Q^\times$ and a stationary bar, $z^3$. This bar $z^3$, which has its ends in adjustable bearings in the frame A, is arranged within the scrap-apron $A^4$, or rather below it, as regards its upper line of travel, and by it the proper operation of the scrap-roller and scrap-apron is facilitated.

To insure the proper action of the fingers $Y^1$, the scrap-roller Z, and the stationary bar $z^3$, said roller, bar, and shaft $y$ of said fingers are all made adjustable together and yielding, to meet various irregularities, both as regards thickness of dough and in other respects. This may be accomplished as follows: The boxes $y'$ of the finger-shaft $y$ are connected by pivoted links $z^1$ with the roller $Q^\times$, which is connected by links $z^2$ with the bar $z^3$, having its ends arranged in adjustable bearings in the frame A. The finger-shaft $y$ is connected by pivoted links $z^{\times}$ with the scrap-roller Z. Thus a flexible arrangement and connection is established of the finger-shaft boxes $y'$, the finger-shaft $y$, and the roller Z, which enables each part to yield, independently of the others, to any obstruction which may be presented by the accidental introduction of lumps, or by increased thicknesses of dough, and to automatically resume their proper position after being relieved of such obstruction.

As regards the general operation the scrap and crackers are carried along by the apron $A^2$. After leaving the bed-plate and cutters, the fingers $Y^1$ separate the crackers from the scrap. The crackers are carried by the apron $A^2$ under the apron $A^4$ and deposited on the apron $A^3$, and the scrap is passed under the roller Z, and is carried by the apron $A^4$ to any suitable receptacle.

What I claim as new, and desire to secure by Letters Patent, is—

1. The combination of the bed-plate B and bed-supporting plate $B^2$, provided with the interposed strips $a$ $a$, the inclined planes $C^{\times}$ D, bar C, and screw E, for raising and lowering the bed-plate, substantially as described.

2. The combination of the main shaft L, gearing $R^1$ $R^2$ $R^3$, shafts S $S^{\times}$, and bevel-gearing $s^1$, $s^2$, $s^3$, and $t$, for driving the rolls T $T^2$, the whole arranged as herein shown and described.

3. The arrangement of the crimping-roll W in adjustable bearings between the dough-roller T and apron-roller $O^2$, as shown and described, for the purpose specified.

4. The scrap-roller Z, arranged to bear upon the apron which carries off the scrap, whereby said roller is driven by the friction of the dough on said apron, substantially as specified.

5. The combination of the stationary bar $z^3$ and the scrap-roller Z, said bar being arranged to support the scrap-apron beneath said roller Z, which bears on said apron, essentially as described.

6. The combination of the scrap-roller Z, the stationary bar $z^3$, and the finger-shaft $y$, all made adjustable together, substantially as and for the purposes herein set forth.

7. The scrap-roller Z, attached to the finger-shaft $y$ by independent links or rods $z^{\times}$, which allows its ends to rise independently of each other, substantially as described.

JOSEPH PARR.

Witnesses:
HENRY T. BROWN,
BENJAMIN W. HOFFMAN.